(12) United States Patent
Takeshita et al.

(10) Patent No.: US 6,407,834 B1
(45) Date of Patent: Jun. 18, 2002

(54) OPTICAL WAVE NETWORK SYSTEM AND METHOD OF MONITORING A NETWORK TROUBLE

(75) Inventors: Hitoshi Takeshita; Naoya Henmi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/153,217

(22) Filed: Sep. 14, 1998

(30) Foreign Application Priority Data

Sep. 16, 1997 (JP) .............................................. 9-268253

(51) Int. Cl.[7] .............................................. H04B 10/08
(52) U.S. Cl. ........................ 359/110; 359/117; 359/124; 359/128; 359/174; 359/176; 359/177; 359/179
(58) Field of Search ................................ 359/110, 117, 359/124, 128, 119, 174, 176, 177, 179

(56) References Cited

U.S. PATENT DOCUMENTS

| | | | | |
|---|---|---|---|---|
| 5,625,478 A | * | 4/1997 | Doerr et al. ................. | 359/125 |
| 5,870,212 A | * | 2/1999 | Nathan et al. ............... | 359/119 |
| 5,914,798 A | * | 6/1999 | Liu ........................ | 359/128 X |
| 6,005,694 A | * | 12/1999 | Liu ............................. | 359/110 |
| 6,046,833 A | * | 4/2000 | Sharma et al. .............. | 359/119 |
| 6,075,630 A | * | 6/2000 | Nishio ........................ | 359/110 |
| 6,097,516 A | * | 8/2000 | Almstrom .................... | 359/119 |
| 6,226,111 B1 | * | 5/2001 | Chang et al. ................ | 359/119 |

OTHER PUBLICATIONS

Kawamura et al, "Self-Healing ATM Networks Based on Virtual Path Concept", IEEE Journal on Selected Areas in Communications, vol. 12, No. 1, pp. 120–127, Jan. 1994.*

Kajiyama et al, "An ATM VP–Based Self–Healing Ring", IEEE Journal on Selected Areas in Communications, vol. 12, No. 1, pp. 171–178, Jan. 1994.*

Watanabe et al, "Optical Path Cross–Connect Node Architecture Offering High Modularity for Virtual Wavelength Paths", IEICE Trans. Commun., vol. E78–B, No. 5, pp. 686–693, May 1995.*

* cited by examiner

Primary Examiner—Thomas Mullen
(74) Attorney, Agent, or Firm—Scully, Scott, Murphy & Presse

(57) ABSTRACT

Optical regenerative relay amplifier 102 has a function for monitoring the power of optical signals from an optical fiber 101, and issuing an optical signal trouble detection signal (AIS (Alarm Indication Signal)) for shutting down the optical power in case that optical signal inputs are lost, and notifying the trouble, and optical ADMs 103 have a wavelength path selecting function, a wavelength path bundle function, and a wavelength path trouble or quality monitoring function in addition to an AIS issue function, and the optical cross-connect systems 104 have an AIS issue function, a function for monitoring a trouble or quality deterioration of optical signals for every wavelength path, a wavelength path grooming function, and a wavelength path protection function, and the terminal stations 105 transmit and receive services by optical signals having predetermined wavelengths, and monitoring a trouble or quality deterioration of optical signals for every wavelength path is conducted without depending on signal speed and format.

28 Claims, 4 Drawing Sheets

OPTICAL WAVE NETWORK SYSTEM AND METHOD OF MONITORING A NETWORK TROUBLE

BACKGROUND OF THE INVENTION

The present invention relates to an optical wave network system by means of a wavelength multiplex technique in optical communication or optical exchange, and more particularly to a network trouble monitoring method for efficiently providing multimedia service by constructing an economical and pliable network, and an optical communication or optical exchange system utilizing the method.

A wavelength division multiplexing (WDM) method is a transmission method for multiplexing and transmitting signal light having a number of different carrier optical wavelengths in one optical fiber, and is a technique that is useful for increase of transmission capacity. In a conventional network equipped for management, maintenance and control thereof, there is one optical wavelength of a signal transmitted in an optical fiber. In this case, with regard to monitoring of a trouble or quality deterioration of an optical transmission line, meaning monitoring the disconnection or deterioration of an optical signal for every wavelength of an optical signal, a method based on a time division multiplexing (TDM) method is utilized, and is constructed in accordance with a method defined by GR253-CORE of the Bellcore standard, for example. Particularly, main signals are contained in standardized transmission frames that are partitioned with respect to time, and information for network control is added to the signals as a frame overhead in accordance with a standardized format. In each network element, monitoring of a trouble or quality deterioration of an optical transmission line is conducted by analyzing or renewing this overhead information.

In recent years, a demand for multimedia service that requires several M(mega)b/s bands has rapidly increased, and a necessity of enlarging communication capacity of individual service has occurred. In addition to this, a transmission system that can be efficiently adapted to various transmission speeds or formats such as a video image, voice and data is earnestly desired.

In the case of providing service by using a new synchronous network, it is necessary that, by means of a time multiplexing method, the service is mapped into a frame of a transmission speed or a format provided by the new synchronous network and is transmitted between points. Unless that multimedia service having various transmission speeds is always mapped into a fixed frame, the frame or network has to be reconstructed in accordance with a demand that continuously changes. In the case that the transmission is conducted by using frames of 1.5 Mb/s, 50 Mb/s and 150 Mb/s, for example, when the service provided between points changes such that voice (64 Kb/s) changes to a dynamic image (64 Mb/s) and voice (64 Kb/s), an interface transfer with the 1.5 Mb/s frame, the 50 Mb/s frame and the 150 Mb/s frame has to be conducted many times. Also, at the same time, since it is necessary that the frame overhead information for the network control is renewed at any time, the control is complicated. Moreover, in order to enlarge the transmission capacity, it is necessary to newly define a format of the frame and conduct standardization.

Namely, from a controllability and flexibility standpoint, it is said that the monitoring of a trouble or quality of the optical transmission line in accordance with the new synchronous network is unsuitable for a network that handles various formats and transmission speeds. Although it becomes possible to multiply and contain a plurality of optical channels in one optical fiber, the monitoring of a trouble or quality deterioration of the optical transmission line using a wavelength multiplexing technique is not defined in the conventional method of monitoring a trouble or quality deterioration of the optical transmission line.

Therefore, in order to efficiently provide multimedia service for which demand is rapidly increasing, it must be taken into account that the communication capacity occupied per service is large and that the signal formats vary, and that these tendencies will be greater in the future. In order to construct a flexible and highly reliable service transfer network, it is necessary to realize a method of monitoring a trouble or quality deterioration of an optical transmission line, which is suitable for a wavelength multiplexing optical network.

SUMMARY OF THE INVENTION

Therefore, the objective of the present invention is to solve the above task, and to provide an optical wave network system capable of monitoring a trouble or quality deterioration of an optical transmission line in transmission of various service data and of transferring trouble information.

Another objective of the present invention is to provide an optical wave network system capable of monitoring a trouble or quality deterioration of an optical transmission line in transmission of various service data and of transferring trouble information, which is suitable for a change of a transmission speed of a transmission signal and a signal format.

The objective of the present invention is to provide an optical wave network system capable of simplifying network control, in which even though the contents of a service demand continuous change, it is not necessary to follow the change of the contents of the service demand and conduct an interface transfer of a transmission signal with respect to time.

Yet another objective of the present invention is to provide an optical wave network system capable of economically and pliably handling multimedia service of which communication capacity per service is large and which has various formats and transmission speeds.

In order to achieve the above-described objectives, an optical wave network system of the present invention is an optical network system utilizing a wavelength or spatial multiplexing technique in which optical fibers are physical media. The optical wave network system includes a plurality of optical signal terminal stations, and optical network elements connected to the above-described optical fibers for forming wavelength paths between the above-described optical signal terminal stations, and monitors a trouble or quality deterioration of physical path connection and transfers a trouble alarm through the optical network elements for every wavelength path without depending on a transmission speed or format contained in the wavelength paths, and in case that a trouble or quality deterioration of optical signals occurs in the wavelength paths, physically recovers this network trouble by performing a quick failure recovery by means of the above-described optical network elements from the wavelength paths of a using system to predetermined exclusive wavelength paths of a spare system.

Also, in the protection by the above-described wavelength paths of a spare system of the present invention, a method can be adopted, which is constructed to perform a quick failure recovery by retrieving wavelength paths of a spare system that is not in use and is shared in a network.

In the above-described optical wave network system of the present invention, the optical fibers constitute a plurality of transmission lines between optical network elements, of which transmission directions of signals are different, and can be constructed so that wavelength paths having one or more than one different carrier wavelength transmission directions, in the direction of the signals, are formed by wavelength multiplexing, and the above-described wavelength paths can be constructed so as to include virtual wavelength paths which are formed by conducting at least one wavelength conversion between wavelength path terminal ends by means of the above-described optical network elements. A wavelength conversion means that the wavelength 1 of an optical signal, for example, is converted into the wavelength 2, without changing the optical signal information about the wavelength 1. Moreover, the above-described optical network elements can include optical ADMs and optical cross-connect systems, and the above-described optical ADMs or optical cross-connect systems can be constructed so as to have a function for physically reconstructing a network by reconstructing wavelength path connecting condition.

Furthermore, the monitoring of the trouble or quality deterioration of the physical path connection and the transfer of the trouble alarm for every wavelength path in the above-described optical wave network system of the present invention can be conducted by means of average optical power of the above-described optical signals or amplitude of the optical signals.

More particularly, the optical wave network system in accordance with the present invention is an optical network system utilizing a wavelength or spatial multiplexing technique. The optical wave network system at least includes optical signal terminal stations, and includes one or more than one optical network elements of at least one or more than one kinds of optical cross-connect systems or optical ADMs that are optical network elements, or optical regenerative relay amplifiers. And, the optical wave network system monitors a trouble or quality deterioration of physical path connection and transfers a trouble alarm through the optical network elements for every wavelength path or virtual wavelength path without depending on a transmission speed or format contained in the wavelength paths or the virtual wavelength paths, and has a high speed network trouble recovery function for physically conducting protection by quickly recovering the failure at high speed by means of the optical network elements from the wavelength paths or virtual wavelength paths of a using system to predetermined exclusive wavelength paths or virtual wavelength paths of a spare system, or for conducting protection by retrieving wavelength paths or virtual wavelength paths of a spare system that is out of use and is shared in a network, in case that a trouble or quality deterioration occurs in the wavelength paths or the virtual wavelength paths. Also, the optical wave network system has a function for physically reconstructing the network by reconstructing a wavelength path connecting condition in case of receiving a demand, and has a function for conducting long distance optical communication in which optical fibers are physical media by applying wavelength multiplexing to the wavelength paths having at least one or more than one different carrier wavelength directions, in the direction of the transmission, and, if necessary, by conducting at least optical regenerative relay amplification and wavelength distributed control for every wavelength path, and thereby, the optical wave network system has a high speed trouble recovery function in addition to the flexible and economical handling of the service of arbitrary transmission speed or format for every wavelength path or virtual wavelength path.

In the optical layer using a wavelength or spatial multiplexing technique, services are allocated for every wavelength path in which communication channels between points are allocated to each wavelength. Thereby, it is possible to conduct communication that does not depend on a signal transmission speed or format between points connected to each other without reconstructing the network or conducting an interface transfer with respect to time. In other words, if the terminal end points are not changed, it is not necessary to physically reconstruct the network or conduct an interface transfer with respect to time service by service, even though signals to be transmitted are continuously changed to signals having various transmission speeds and formats, such as a video image, voice and data.

Therefore, it is not necessary to reconstruct the network or conduct an interface transfer with respect to time every time the transmission speed is changed, and it is possible to simplify the control. Also, it is not necessary to conduct standardization of signal formats for increasing the transmission speed. Moreover, it is possible to economically conduct the signal transmission by utilizing the wide band characteristic of light.

Also, in the optical layer, a physical network trouble recovery function can be realized by monitoring a trouble or quality deterioration of an optical transmission line at a unit of the wavelength paths. In this monitoring of the wavelength paths, an arrangement of an efficient network function can be realized by conducting the monitoring by means of network elements such as an optical cross-connect system and an optical add drop multiplexer (referred to as an "ADM") which has a function for reconstructing the wavelength paths in the optical layer. Also, by utilizing optical average power in a method of monitoring the wavelength paths, high speed monitoring that does not depend on a transmission speed or format can be easily realized by means of a simple apparatus arrangement.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The present invention will be explained in detail by the first and second embodiments below.

Figure 1:
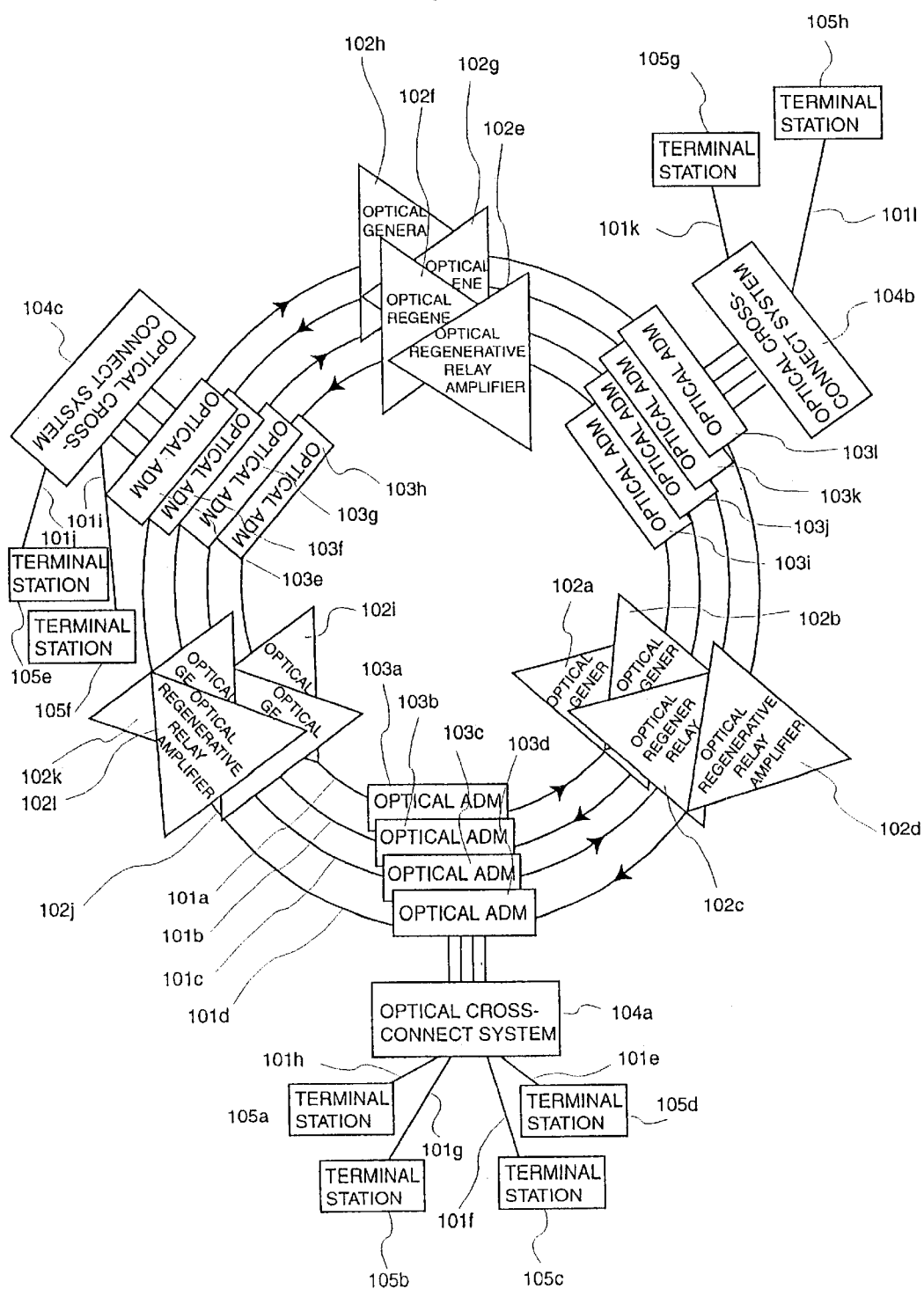
FIG. 1 is a view for explaining a first embodiment of an optical wave network system in accordance with the present invention.

The first embodiment of the present invention will be explained in detail by referring to the figures. FIG. 1 is a view for explaining an arrangement for realizing an optical wave network system of this embodiment.

The optical wave network system of this embodiment is constructed of optical fibers 101, optical regenerative relay amplifiers 102, optical ADMs 103, optical cross-connect systems 104, and terminal stations 105. The optical fibers 101 constitute four transmission lines of which transmission directions are different from each other, and the optical ADMs 103 are connected to each other in the shape of a ring through the optical regenerative relay amplifiers 102 by the optical fibers. Also, the optical ADMs 103 are connected to the optical cross-connect systems 104, and further, the plurality of terminal stations 105 are connected to the optical cross-connect systems 104, and in this way, the optical wave network system is constructed.

The optical fibers 101 are physical media for transmitting optical signals having different plural wavelengths subjected to wavelength multiplexing.

The optical regenerative relay amplifiers 102 have a function for optically amplifying optical signals collectively that have different plural wavelengths subjected to wavelength multiplexing. Also, the optical regenerative relay amplifiers have means for monitoring the power of optical signals to be input, and issue an optical signal trouble detection signal (referred to as an "AIS" (Alarm Indication Signal)) to other network elements of optical layers by shutting down optical outputs in case that optical signal inputs are lost unexpectedly, and can notify the trouble.

The optical ADMs 103 have a wavelength path selecting function, a wavelength path bundle function, a wavelength path trouble or quality deterioration monitoring function and an AIS issue function. The optical ADMs have a function for selecting and taking out only one or more desired wavelength paths from a plurality of wavelength paths which are bundled and transmitted in the optical fibers 101 by selecting and taking out only optical signals having one or more desired wavelengths from optical signals that have different plural wavelengths subjected to wavelength multiplexing and are transmitted through the optical fibers 101. Also, the optical ADMs have a function for bundling wavelength paths having wavelengths different from wavelengths of wavelength paths that are bundled and transmitted in the optical fibers 101 by inputting optical signals of plural wavelengths into the optical fibers 101, which pass through the optical ADMs 103. Moreover, it is possible to monitor a trouble or quality deterioration of optical signals by means of a method utilizing optical power for every wavelength path. Thereby, high speed monitoring that does not depend on a transmission speed and format for every wavelength path can be realized. And, in case that a trouble or quality deterioration is detected in the wavelength paths, it is possible to notify other network elements of the occurrence of a trouble in the corresponding wavelength paths by issuing the AIS to the network elements of other optical layers. The issue of the AIS can be realized at a high speed by shutting down optical power of the corresponding wavelength paths.

The optical cross-connect systems 104 have a function for monitoring a trouble or quality deterioration of optical signals for every wavelength path, an AIS issue function, a wavelength path grooming function, and a wavelength path protection function. The monitoring of a trouble or quality deterioration of the optical signals for every wavelength path is realized as high speed monitoring which does not depend on a transmission speed or format by means of a method utilizing optical power for every wavelength path. And, in case that a trouble or quality deterioration is detected in the wavelength paths, it is possible to notify other network elements of the occurrence of a trouble in the corresponding wavelength paths by issuing the AIS to the network elements of other optical layers. The issue of the AIS can be realized at a high speed by shutting down optical power of the corresponding wavelength paths. The grooming of the wavelength paths is realized by interchanging the wavelength path connection. Grooming means separating each of the plural bundled wavelength paths into respective parts, interchanging the respective parts, and again multiplexing the interchanged parts into plural bundled wavelength paths. The protection of the wavelength paths is conducted by performing a quick failure recovery, in case the optical cross-connect systems 104 themselves detect the occurrence of a wavelength path trouble or the deterioration of wavelength path quality, or in case the optical cross-connect systems 104 themselves detect the AIS issued by the network elements of other optical layers.

The terminal stations 105 include means for converting image, voice or data communication services which are electric signals to optical signals having appropriate wavelengths, and transmitting the optical signals through the optical fibers as mediums, and means for receiving the optical signals having the appropriate wavelengths through the optical fibers as mediums, converting the optical signals to electric signals, and utilizing image, voice or data communication services.

For the wavelength paths formed by the network elements of this embodiment, in addition to the wavelength paths formed by allocating a single wavelength to transmission signals between terminal ends of the terminal stations, by applying wavelength conversion to different wavelengths between the suitable network elements for avoiding duplicate use of the same wavelength by different services, it is possible to use wavelength paths which are formed by allocating a plurality of wavelengths to transmission signals between terminal ends of the terminal stations, and the wavelength paths like the latter are utilized as virtual wavelength paths.

Also, the wavelength path selecting function, the wavelength path bundle function, the wavelength path trouble or quality monitoring function and the AIS issue function in the optical ADMs, and the function for monitoring a trouble or quality deterioration of optical signals for every wavelength path, the AIS issue function, the wavelength path grooming function, and the wavelength path protection function in the optical cross-connect systems can be realized by any method in which, in the wavelength paths including the above-described virtual wavelength paths, in order to recover a trouble by switching from the wavelength paths of a using system in which the optical signals may have deteriorated to wavelength paths of a normal spare system, exclusive wavelength paths which are previously prepared are made to be spare wavelength paths, and a method in which usable wavelength paths of spare wavelength paths which are shared by the optical wave network system are retrieved and selectively used. Further, the wavelength paths can conduct reconstruction with respect to the wavelength paths by means of the network elements, if necessary.

The above switching control of the optical wave network system, including the reconstruction, can be realized by a method based on dispersion control of individual network elements or a method of providing a manager for controlling the entire network and conducting centralized control.

Transmission operation of service information in the optical wave network system of this embodiment will be explained by referring to FIG. 1. The transmission operation will be explained below by an example in which the service information is transmitted from the terminal station 105*a* to the terminal station 105*g* (or 105*h* and 105*f*) as its transmission path.

Image, voice or data communication services are converted to optical signals having appropriate wavelengths (referred to as a wavelength 1), and are transmitted from the specific terminal station 105a to the optical cross-connect system 104a through mediums of the optical fibers.

The optical cross-connect system 104a is connected to the terminal station 105a and the optical ADM 103a by the optical fiber 101h and so forth, and also, a connection relation between the terminal stations 105a–105d and the optical ADMs 103a–103d can be changed. Accordingly, optical signals transmitted from the terminal station 105a are guided to the optical ADM 103a that is set by the optical cross-connect system 104a. By changing connection set by means of the optical cross-connect system 104a, the optical signals from the terminal station 105a can be guided to the optical ADM 103b.

Also, the optical cross-connect system 104a can monitor a trouble or quality deterioration of optical signals input from the terminal stations 105a–105d without depending on a transmission speed and format by means of a method utilizing optical power, and issue an AIS utilizing the optical power when detecting the trouble. Moreover, the optical cross-connect system can also recover the trouble by switching a using system to a spare system by a quick failure recovery.

The optical signals guided to the optical ADM 103a having plural wavelengths are multiplexed in wavelength and the multiplexed signals are input into the optical fiber 101a by the optical ADM 103a, which passes through the optical ADM 103a. At this time, the optical ADM 103a has a function for monitoring a trouble or quality deterioration of optical signals input from the optical cross-connect system 104a by means of a method utilizing optical power without depending on a transmission speed and format, and issuing an AIS utilizing optical power when detecting the trouble. The optical signals multiplied with respect to a wavelength into the optical fiber 101a are transmitted to the optical ADM 103i by means of a long distance wavelength multiplexing optical transmission technique using the optical regenerative relay amplifier 102a having a function for collectively applying optical regenerative relay amplification to the,plural wavelength optical signals with respect to a wavelength.

The optical ADM 103i selectively takes out only an optical signal having the wavelength 1 from the plural wavelength optical signals multiplexed in wavelength where the multiplexed signals are input and transmitted in the optical fiber 101a, and guides the optical signal to the optical cross-connect system 104b. At this time, the optical ADM 103i has a function for monitoring a trouble or quality deterioration of optical signals to be input by means of a method utilizing optical power without depending on a transmission speed and format, and issuing an AIS utilizing optical power when detecting the trouble.

The optical signals guided to the optical cross-connect system 104b are guided to the specific terminal station 105g by the optical cross-connect system 104b. At this time, the optical cross-connect system 104b can monitor a trouble or quality deterioration of the optical signals input from the optical ADMs 103i–103l by means of a method utilizing optical power without depending on a transmission speed and format, and can issue an AIS utilizing optical power when detecting the trouble. Moreover, by switching a using system to a spare system by performing a quick failure recovery, the trouble can be recovered. The terminal station 105g converts the optical signals having the wavelength 1, which are input from the optical cross-connect system 104b, to electric signals, and takes out video image, voice or data communication service.

In other words, communication between points using the optical signals of the wavelength 1 becomes conducted, in which the terminal station 105a is a transmission terminal and the terminal station 105g is a reception terminal. A path constructed of this terminal station 105a, the optical fiber 101h, the optical cross-connect system 104a, the optical ADM 103a, the optical fiber 101a, the optical regenerative relay amplifier 102a, the optical ADM 103i, the optical cross-connect system 104b, the optical fiber 101k and the terminal station 105g, through which the optical signals having the wavelength 1 pass, becomes a wavelength path 1.

A change from the reception terminal station 105g to the reception terminal station 105h is conducted by the optical cross-connect system 104b, and a change from the reception terminal station 105g to the reception terminal station 105f can be realized by controlling the optical ADM 103i, the optical ADM 103h and the optical cross-connect system 104b.

Since the wavelength path 1 is multiplied with respect to a wavelength by optical signals having other wavelengths when passing through the optical fiber 101a, the wavelength path 1 is bundled with the other wavelength paths by means of a wavelength multiplexing technique when passing through the optical fiber 101a. Therefore, since, even though a transmission speed or format contained in the wavelength path changes, this change does not affect the other wavelength paths, so it is not necessary to change a bundle method. The terminal stations that become transmission and reception terminals may only include an interface with the optical signals, and the communication between points can be conducted without normalizing the transmission speed or format.

Figure 2:
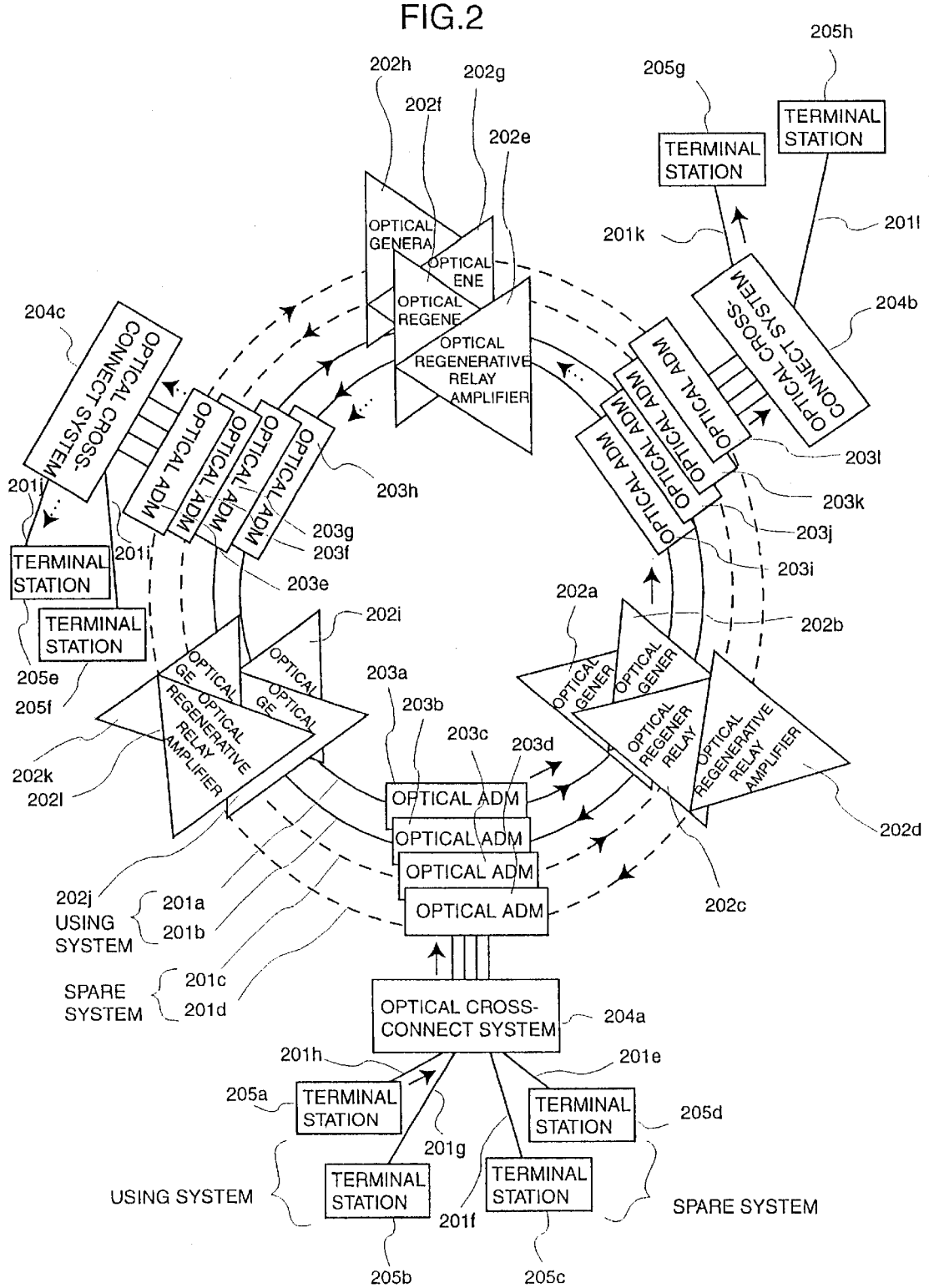
FIG. 2 is a view for explaining the operation of the first embodiment.

Next, detailed operation of the first embodiment of the above-described present invention will be explained by referring to FIG. 2.

In this embodiment, the terminal station 205a is a using system for transmitting the wavelength 1, the terminal station 205b is a using system for transmitting the wavelength 2, the terminal station 205c is a spare system for transmitting the wavelength 1, the terminal station 205d is a using system for transmitting the wavelength 2, and the terminal station 205g receives the wavelength 1 and the terminal station 205h receives the wavelength 2. Also, the optical fibers 201a and 201b are using systems, and the optical fibers 201c and 201d are spare systems.

First, the using system will be explained in detail.

The terminal stations 205a–205d and the optical ADMs 203a–203d are connected to each other by the optical cross-connect system 204a through the optical fibers, respectively. Also, the optical cross-connect system 204a can change connection condition of the terminal stations and the optical ADMs so that, for example, the condition in which the terminal station 205a and the optical ADM 203a, and the terminal station 205b and the optical ADM 203b are connected to each other, respectively, is made to be the condition in which the terminal station 205a and the optical ADM 203b, and the terminal station 205b and the optical ADM 203a are connected to each other, respectively. In the same manner, the terminal stations 205g–205h and the optical ADMs 203i–203l are connected to each other by the optical cross-connect system 204b, and the terminal stations 205e–205f and the optical ADMs 203e–203h are connected to each other by the optical cross-connect system 204c, respectively. The optical ADM 203a is connected to the optical cross-connect system 204a. The optical ADM 203a multiplies the optical signals that pass through the optical fiber 201a by the optical signals having the wavelength 1 and the wavelength 2 which are transmitted from the terminal stations 205a and 205b through the optical cross-connect system 204a. The optical ADM 203c multiplies the optical signals that pass through the optical fiber 201c via the optical cross-connect system 204a by the optical signals having the wavelength 1 and the wavelength 2 which are transmitted from the terminal stations 205c and 205d. The plural wavelength optical signals having the wavelength 1 and the wavelength 2 are multiplexed in wavelength and the multiplexed signals are input into the optical fibers 201a and 201c, and the optical signals are collectively and optically amplified with respect to a wavelength by the optical regenerative relay amplifiers 202a and 202c on the way to the optical ADMs 203i and 203k, respectively.

The optical ADM 203i divides with respect to a wavelength only the optical signals having the wavelength 1 from the optical fiber 201a, and guides the divided signals to the optical cross-connect system 204b. The optical cross-connect system 204b couples the optical signals having the wavelength 1 to the reception terminal station 205g. At this time, the optical signals having the wavelength 1 are guided to the reception terminal station 205g through the transmission terminal station 205a, the optical cross-connect system 204a, the optical ADM 203a, the optical regenerative relay amplifier 202a, the optical ADM 203i and the optical cross-connect system 204b. A path from the transmission terminal station 205a, to the reception terminal station 205g through which the optical signals having the wavelength 1 pass, becomes a wavelength path 1.

Since optical communication by means of a wavelength or spatial multiplexing technique is conducted, when the wavelength path 1 is established, even though the service contents supplied from the transmission terminal station 205a to the reception terminal station 205g by the wavelength path 1 are changed to video image, voice, data communication and so forth, it is not necessary to re-establish the path, and a network node which handles optical signals can include an interface of the optical signals. The optical cross-connect system 204b has a grooming function for the wavelength paths, and, by changing the connection of the optical signals, couples the optical signals having the wavelength 1, which are input from the optical ADM 203i, to the terminal station 205h, and can reconstruct the wavelength path 1.

On the other hand, the optical signals having the wavelength 2 pass through the optical ADM 203i, and are optically amplified by the optical regenerative relay amplifier 202e, are divided with respect to a wavelength by the optical ADM 203h and are guided to the optical cross-connect system 204c. The optical cross-connect system 204c couples these optical signals having the wavelength 2 to the reception terminal station 205e. Thereby, like in the case of the wavelength path 1, a wavelength path 2 is formed. In the same manner, the optical cross-connect system 204c can reconstruct the wavelength path 2.

Next, the spare system will be explained in detail.

The optical signals of the spare system, which have the wavelength 1 and the wavelength 2, are transmitted from the transmission terminal stations 205c and 205d, respectively. At this time, the optical signals having the wavelength 1, which are transmitted from the terminal station 205c, are the same as the optical signals transmitted from the terminal station 205a. Similarly, the optical signals having the wavelength 2, which are transmitted from the terminal station 205d, are the same as the optical signals transmitted from the terminal station 205b. The optical signals of the spare system, which have the wavelength 1, are guided to the optical cross-connect system 204b through the transmission terminal station 205c, the optical cross-connect system 204a, the optical ADM 203c, the optical regenerative relay amplifier 202c and the optical ADM 203k. The optical cross-connect system 204b has a function for monitoring a trouble or quality deterioration for every wavelength path, and monitors a trouble or quality deterioration of the optical signals of the using system and the spare system, which have the wavelength 1, and, if the trouble does not occur in the optical signals of the wavelength 1 of the spare system, couples the optical signals of the wavelength 1 of the spare system to the reception terminal station 205g.

The monitoring of a trouble or quality deterioration of the optical signals is conducted by utilizing optical power. Trouble monitoring items of the optical signals are a cut of the optical signals in the wavelength path and a wavelength of the optical signals, which can be referred to as a wavelength path identifier. Also, the monitoring of quality deterioration can be realized by monitoring an S/N (Signal to Noise) Ratio of the optical signals. By utilizing optical power for the monitoring, it is possible to conduct the high speed and stable monitoring of the trouble or quality deterioration without depending on a transmission speed and format. Items to be monitored are a cut of the wavelength path and a wavelength, that can be a wavelength path ID for a wavelength path trouble, and an optical S/N ratio as a quality monitoring item. "A cut of the wavelength path and a wavelength" means that "optical signal intensity" and "optical signal wavelength" are cut, both which are handled as an ID. Hence, by monitoring them, the cut of the wavelength path can be monitored. A cutting trouble of the wavelength path is detected in case optical signal power of the wavelength path that is being monitored becomes zero and optical noise power increases. An ID trouble of the wavelength path is detected in case optical signal power of the wavelength path that is being monitored becomes equal to or less than a predetermined threshold and optical noise power does not change. Quality of the wavelength path is obtained by calculating a ratio of optical signal power and optical noise power, and an alarm of quality deterioration is notified in case that the value of the ratio becomes equal to or less than a predetermined threshold. In addition, at this time, in the optical regenerative relay amplifier, APC control (Automatic Power Control) is applied to the wavelength multiplexing signals which pass through the optical fibers 201a–201d.

On the contrary, in case the trouble occurs, by connecting the optical signals of the wavelength 1 of the spare system, the trouble that has occurred can be recovered at high speed by protection so that the reception terminal station 205g can normally receive the optical signals. The trouble or quality monitoring of the optical signals is conducted not only by the optical cross-connect system 204b, but also by the optical cross-connect system 204a, the optical ADMs 203a, 203c, 203i and 203k, and the optical regenerative relay amplifiers 202a and 202c. In case the optical ADM 203a detects a trouble, for example, the optical ADM 203a issues an AIS downstream by shutting down an optical output. And then the network node located downstream, in other words the optical regenerative relay amplifier 202a, detects the trouble and issues the AIS downstream.

The network node that has detected the trouble in this manner notifies the optical cross-connect system 204b of the trouble that has occurred in the wavelength path 1 of the using system by relaying the AIS downstream, and can recover the trouble. By utilizing the optical power for the issue of the AIS for every wavelength path, it is possible to transfer the AIS at high speed without depending on a transmission speed and format. Therefore, it becomes possible to recover the trouble at high speed.

In case the optical cross-connect system 204a detects a trouble in the using system, the optical cross-connect system 204a applies protection from the using system to the spare system, and thereby, trouble recovery can be conducted. With regard to the optical signals having the wavelength 2, monitoring of a trouble or quality deterioration of the optical signals is conducted in the same manner, and in case a trouble occurs in the using system, the trouble can be recovered by applying protection to the spare system.

Figure 3:
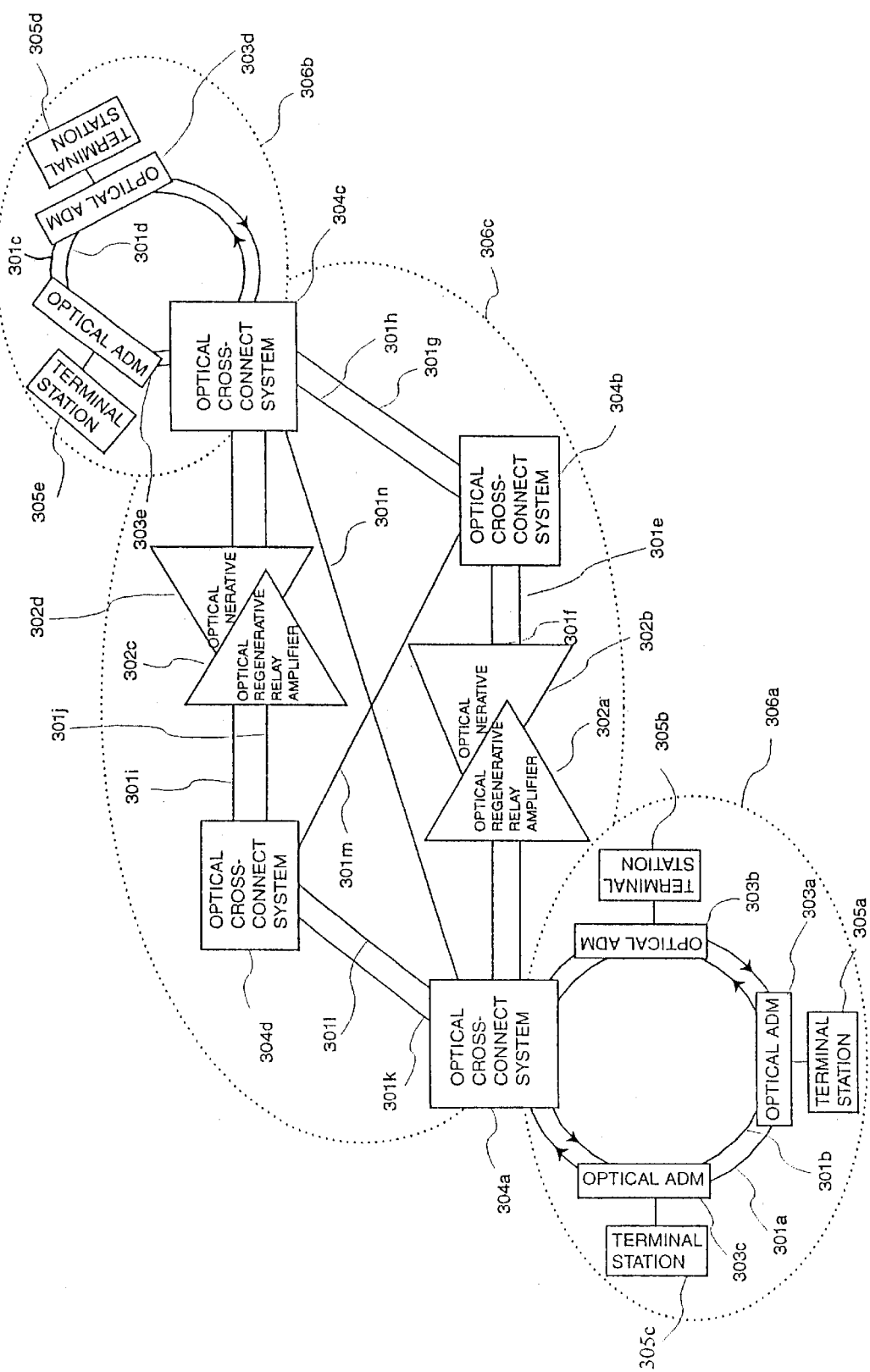
FIG. 3 is a view for explaining a second embodiment of an optical wave network system in accordance with the present invention.

Next, a second embodiment of the present invention will be explained in detail by referring to the figures. FIG. 3 is a view for explaining an arrangement for realizing an optical wave network system of this embodiment.

The optical wave network system of this embodiment is constructed of optical fibers 301a–301n, optical regenerative relay amplifiers 302a–302d, optical ADMs 303a–303e, optical cross-connect systems 304a–304d, and terminal stations 305a–305e.

The plurality of optical cross-connect systems 304a–304d has a network 306c constructed so as to be connected to two transmission lines in mesh, of which transmission directions are different from each other and which consist of the optical fibers 301e and 301l, and so as to be directly connected to a single transmission line which consists of the optical fibers 301n–301m, and networks 306a and 306b constructed so that the above-described optical cross-connect systems 304a and 304c and the plurality of the optical ADMs 303a–303c and 303d–303e are connected to two transmission lines in the shape of a ring, of which transmission directions are different from each other and which consist of the optical fibers 301a–301b and 301c–301d. Also, the terminal stations 305a–305e are connected to the optical ADMs 303a–303e, respectively, and in this way, the optical wave network system is constructed as a whole.

The optical fibers 301a–301n are physical media for transmitting optical signals having different plural wavelengths subjected to wavelength multiplexing.

The optical regenerative relay amplifiers 302a–302d have a function for optically amplifying optical signals collectively which have different plural wavelengths subjected to wavelength multiplexing. Also, the optical regenerative relay amplifiers have means for monitoring the power of optical signals to be input, and in case the optical signal inputs are lost unexpectedly, in order to detect a circuit trouble and notify that it is under trouble condition, the optical regenerative relay amplifiers issue an AIS to other network elements of optical layers by shutting down optical outputs, and can notify the trouble.

The optical ADMs 303a–303e have a wavelength path selecting function, a wavelength path bundle function, a wavelength path trouble or quality monitoring function and an AIS issue function. The optical ADMs have a function for selecting and taking out only one or more than one desired wavelength paths from a plurality of wavelength paths which are bundled and transmitted in the optical fibers 301a–301n by selecting and taking out only optical signals having one or more desired wavelengths from plural wavelength optical signals subjected to wavelength multiplexing and are transmitted through the optical fibers 301a–301n.

Also, the optical ADMs have a function for bundling wavelength paths having wavelengths different from wavelengths which are bundled and transmitted in wavelength paths which are bundled and transmitted in the optical fibers 301a–301n by inputting multiplexed optical signals in the optical fibers 301a and 301b and the optical fibers 301c and 301d, which pass through the optical ADMs 303a–303c and the optical ADMs 303d and 303e, respectively. Moreover, it is possible to monitor a trouble or quality deterioration of optical signals for every wavelength path by means of a method utilizing optical power for every wavelength path. Thereby, high speed monitoring that does not depend on a transmission speed and format for every wavelength path can be realized. And, in case that a trouble or quality deterioration is detected in the wavelength paths, it is possible to notify other network elements of the occurrence of a trouble in the corresponding wavelength paths by issuing the AIS to the network elements of other optical layers. The issue of the AIS can be realized at high speed by shutting down the optical power of the corresponding wavelength paths.

The optical cross-connect systems 304a–304d have a function for monitoring a trouble or quality deterioration of optical signals for every wavelength path, an AIS issue function, a wavelength path grooming function, and a wavelength path protection function. In the monitoring of a trouble or quality deterioration of the optical signals for every wavelength path, high speed monitoring that does not depend on a transmission speed or format is realized by means of a method utilizing the optical power for every wavelength path. And, in case a trouble or quality deterioration is detected in the wavelength paths, it is possible to notify other network elements of the occurrence of a trouble in the corresponding wavelength paths by issuing the AIS to the network elements of other optical layers. The issue of the AIS can be realized at high speed by shutting down the optical power of the corresponding wavelength paths. The grooming of the wavelength paths is realized by reconstructing wavelength path connection. The protection of the wavelength paths is conducted in case the optical cross-connect systems 304a–304d themselves detect the occurrence of a wavelength path trouble or the deterioration of wavelength path quality, or in case the optical cross-connect systems 304a–304d themselves detect the AIS issued by the network elements of other optical layers.

The terminal stations 305a–305e include means for converting image, voice or data communication services which are electric signals to optical signals having appropriate wavelengths, and transmitting the optical signals through the optical fibers as mediums, and means for receiving the optical signals having the appropriate wavelengths through the optical fibers as mediums, converting the optical signals to electric signals, and utilizing image, voice or data communication services.

Next, operation of the optical wave network system of this embodiment will be explained by referring to FIG. 3. Transmission operation will be explained below by an example in which service information is transmitted from the terminal station 305a to the terminal station 305d (or 305e and 305b) as its transmission path.

Image, voice or data communication services are converted to optical signals having appropriate wavelengths (referred to as a wavelength 1), and are transmitted from the terminal station 305a to the optical ADM 303a through the optical fibers as mediums. The plural wavelength optical signals guided to the optical ADM 303a are multiplexed and inputted into the optical fibers 301a and 301b by the optical ADM 303a, which pass through the optical ADM 303a. At this time, the optical ADM 303a has a function for monitoring a trouble or quality deterioration of optical signals to be input without depending on a transmission speed and format by means of a method utilizing optical power, and issuing an AIS utilizing optical power when detecting the trouble.

The optical ADM 303a is connected to the terminal station 305a, the optical ADM 303b and the optical ADM 303c, which constitutes the network 306a of a ring form. Similarly, the terminal station 305d is connected to the optical ADM 303d and the optical ADMs 303d and 303e are connected to each other through the optical fibers 301c and 301d, which constitutes the network 306b of a ring form.

The optical cross-connect systems 304a–304d are connected to each other in a mesh form through the optical fibers 301e–301n, which constitutes the network 306c. In this network 306c, the optical regenerative relay amplifiers 302a–302d are provided for collectively amplifying power of the plural wavelength optical signals that are multiplexed and inputted into the optical fibers 301e, 301f, 301j and 301i, respectively. The optical cross-connect systems 304a–304d can change an optical fiber connection relation in the network 306c. Also, the optical cross-connect systems 304a–304d can monitor a trouble or quality deterioration of optical signals that are input without depending on a transmission speed and format by means of a method utilizing optical power, and issue an AIS utilizing the optical power when detecting the trouble. Moreover, the optical cross-connect systems can also recover the trouble by switching a using system to a spare system by performing a quick failure recovery.

Also, since the network 306a and the network 306b are connected to each other through the optical cross-connect systems 304a and 304c of the network 306c, the optical signals transmitted from the terminal station 305a can be received at the terminal station 305d provided in the network 306b through the network 306c from the network 306a. In other words, the optical cross-connect system 304c switches the optical paths so that the optical signals having the wavelength 1 are input to the network 306b, and thereby, the optical ADM 303d becomes able to receive the optical signals having the wavelength 1.

At this time, the optical cross-connect system 304c can monitor a trouble or quality deterioration of the optical signals without depending on a transmission speed and format by means of a method utilizing optical power, and can issue an AIS utilizing the optical power when detecting the trouble. Moreover, by switching a using system to a spare system by protection, the trouble can be recovered.

The optical ADM 303d selectively takes out only an optical signal having the wavelength 1 from the plural wavelength optical signals that are multiplexed and transmitted in the optical fibers 301c and 301d, and guides the optical signal to the terminal station 305d. At this time, the optical ADM 303d has a function for monitoring a trouble or quality deterioration of optical signals to be input without depending on a transmission speed and format by means of a method utilizing optical power, and issuing an AIS utilizing the optical power when detecting the trouble. The terminal station 305d converts the optical signals having the wavelength 1, which are input from the optical ADM 303d, to electric signals, and takes out video image, voice or data communication service. In other words, communication between points using the optical signals of the wavelength 1 is conducted, in which the terminal station 305a is a transmission terminal and the terminal station 305d is a reception terminal. In the network 306c, in case that the optical signals having the wavelength 1 pass through the optical cross-connect systems 304a, 304b and 304c in that order, a path constructed of this terminal station 305a, the optical ADM 303a, the optical ADM 303b, the optical cross-connect system 304a, the optical regenerative relays amplifier 302a, the optical cross-connect system 304b, the optical cross-connect system 304c, the optical ADM 303d and the terminal station 305d, through which the optical signals pass, becomes a wavelength path 1.

A change from the reception terminal station 305d to the reception terminal station 305e can be conducted by dividing with respect to a wavelength the optical signals which pass through the optical fiber 301d into optical signals having the wavelength 1 by means of the optical ADM 303d and passing the signals there through without guiding them to the terminal station 305d, and dividing the signals with respect to a wavelength in the optical ADM 303e and guiding them to the terminal station 305e. Dividing with respect to a wavelength means that optical signals having plural wavelengths, multiplexed in wavelength, are separated into optical signals having respective wavelengths. Also, a change from the transmission terminal station 305a to the transmission terminal station 305b can be similarly conducted by guiding the optical signals having the wavelength 1 from the terminal station 305a to the optical ADM 303a and not combining with respect to a wavelength the signals with the optical signals which pass through the optical fiber 301b, and guiding the optical signals having the wavelength 1 from the terminal station 305b to the optical ADM 303b and combining with respect to a wavelength the signals with the optical signals which pass through the optical fiber 301b.

Also, in the network 306c, by changing the connection of the optical signals by means of the optical cross-connect systems 304a–304d, it is possible to edit the wavelength path 1. In other words, it is possible to change the wavelength path 1 so as to change the connection of the optical signals having the wavelength 1, which pass through the optical cross-connect systems 304a, 304b and 304c in that order, to the connection of the optical cross-connect systems 304a and 304c in that order. Also, by allocating a path in which the optical cross-connect systems 304a, 304b and 304c are connected to each other in that order to a using system and allocating a path in which the optical cross-connect systems 304a and 304c are connected to each other in that order to a spare system, in case a trouble occurs in the using system, it is possible to remove the cause of the failure which occurs in the network 306c by means of protection, meaning a quick failure recovery, from the using system to the spare system.

Also, in the networks 306a and 306b, since the plural wavelength optical signals multiplexed in wavelength are bi-directionally transmitted in the optical fibers 301a and 301b and the optical fibers 301c and 301d, respectively, it is possible to recover a trouble. In other words, in the network 306a, in the optical fibers 301a and 301b connecting the optical ADM 303b to the optical cross-connect system 304a, in case a trouble occurs between the optical cross-connect system 304a and the optical ADM 303b and communication between points of the terminal station 305a and the terminal station 305d by means of the wavelength path 1 is cut, it is possible to recover the trouble since, if the same signals are transmitted to the optical fibers 301a and 301b, the optical cross-connect system 304a selects the signals transmitting in an opposite direction. At this time, the wavelength path 1 is protected in the terminal station 305a, the optical ADM 303a, the optical ADM 303b, the optical ADM 303a, the optical ADM 303c, the optical cross-connect system 304a, the optical cross-connect system 304b, the optical cross-connect system 304c, the optical ADM 303d and the terminal station 305d. During the protection, monitoring of a trouble or quality deterioration of the optical signals utilizing optical power and a transfer of an AIS is conducted.

Since the wavelength path 1 is multiplexed in wavelength by optical signals having other wavelengths when passing through the optical fibers 301a–301n, the wavelength path 1 is bundled with the other wavelength paths by means of a wavelength multiplexing technique when passing through the optical fibers 301a–301n. Therefore, since, even though a transmission speed or format contained in the wavelength path changes, this change does not affect the other wavelength paths, it is not necessary to change a bundle method. The terminal stations that become transmission and reception terminals may only include an interface with the optical signals, and the communication between points can be conducted without normalizing the transmission speed or format.

Figure 4:
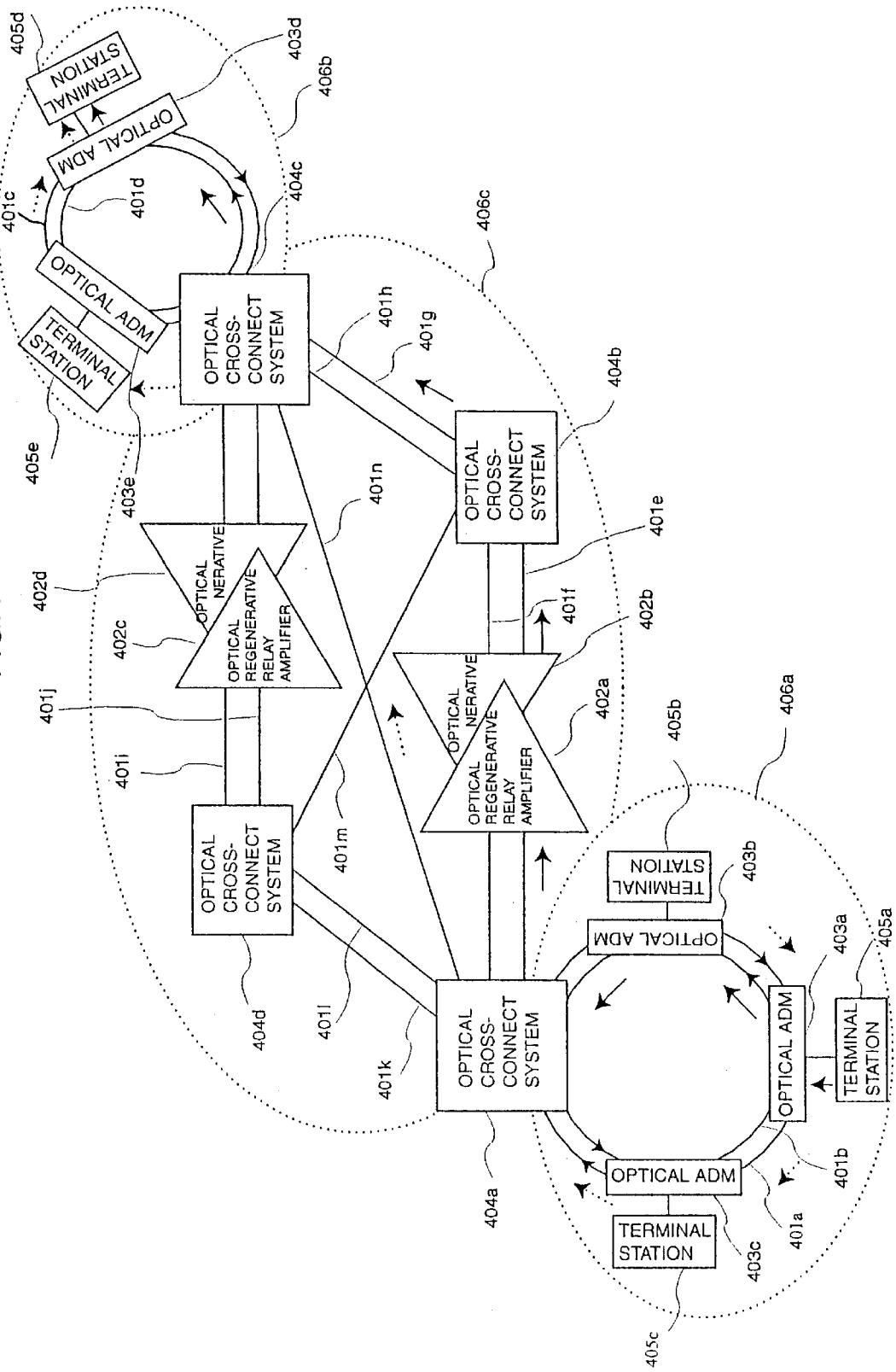
FIG. 4 is a view for explaining the operation of the second embodiment.

Next, more detailed operation of the second embodiment of the above-described present invention will be explained by referring to FIG. 4.

In this embodiment, a terminal station 405a is a using system for transmitting a wavelength 1, and a terminal station 405d receives the wavelength 1. The terminal station 405a bidirectionally transmits optical signals to optical fibers 401a and 401b through an optical ADM 403a.

The optical wave network system is constructed of optical fibers 401a–401n, optical regenerative relay amplifiers 402a–402d, optical ADMs 403a–403e, optical cross-connect systems 404a–404d, and terminal stations 405a–405e. The optical fibers 401a–401n are physical media for transmitting plural wavelength optical signals subjected to wavelength multiplexing.

The optical regenerative relay amplifiers 402a–402d have a function for optically amplifying plural wavelength optical signals collectively that are subjected to wavelength multiplexing. Also, the optical regenerative relay amplifiers have means for monitoring the power of optical signals to be input, and in case that optical signal inputs are lost unexpectedly, the optical regenerative relay amplifiers issue an AIS to other network elements of optical layers by shutting down optical outputs, and can notify the trouble.

The optical ADMs 403a–403e have a wavelength path selecting function, a wavelength path bundle function, a wavelength path trouble or quality monitoring function and an AIS issue function. The optical ADMs have a function for selecting and taking out only one desired wavelength path from a plurality of wavelength paths which are bundled and transmitted in the optical fibers 401a–401n by selecting and taking out only one or more optical signals from plural wavelength optical signals subjected to wavelength multiplexing and are transmitted through the optical fibers 401a–401n. Also, the optical ADMs have a function for bundling the wavelength paths in wavelength paths which are bundled and transmitted in the optical fibers 401a–401n by multiplying optical signals in the optical fibers 401a and 401b and the optical fibers 401c and 401d, which pass through the optical ADMs 403a–403c and the optical ADMs 403d and 403e, respectively. Moreover, it is possible to monitor a trouble or quality deterioration of optical signals for every wavelength path. In this manner, high speed monitoring without depending on a transmission speed and format can be realized by means of a method of monitoring optical signal power and optical noise power for every wavelength path.

Items to be monitored are a cut of the wavelength path and a wavelength, that can be a wavelength path ID for a wavelength path trouble, and an optical S/N ratio and so forth as a quality monitoring item. A cutting trouble of the wavelength path is detected in case that optical signal power of the wavelength path that is being monitored becomes zero and optical noise power increases. An ID trouble of the wavelength path is detected in case that optical signal power of the wavelength path that is being monitored becomes equal to or less than a predetermined threshold and optical noise power does not change. Quality of the wavelength path is obtained by calculating a ratio of optical signal power and optical noise power, and an alarm of quality deterioration is notified in case that the value of the ratio becomes equal to or less than a predetermined threshold. In addition, at this time, in the optical regenerative relay amplifier, APC control is applied to the wavelength multiplexing signals which pass through the optical fibers 401a–401n.

And, in case that a trouble or quality deterioration is detected in the wavelength paths, it is possible to notify other network elements of the occurrence of a trouble in the corresponding wavelength paths by issuing the AIS to the network elements of other optical layers. The issue of the AIS can be realized at high speed by shutting down the optical power of the corresponding wavelength paths.

The optical cross-connect systems 404a–404d have a function for monitoring a trouble or quality deterioration of optical signals for every wavelength path, an AIS issue function, a wavelength path grooming function, and a wavelength path protection function.

In the monitoring of a trouble or quality deterioration of the optical signals for every wavelength path, high speed monitoring that does not depend on a transmission speed or format is realized by means of a method of monitoring optical signal power and optical noise power for every wavelength path. Items to be monitored are a cut of the wavelength path and a wavelength, that can be a wavelength path ID for a wavelength path trouble, and an optical S/N ratio as a quality monitoring item. And, in case that a trouble or quality deterioration is detected in the wavelength paths, it is possible to notify other network elements of the occurrence of a trouble in the corresponding wavelength paths by issuing the AIS to the network elements of other optical layers.

The issue of the AIS can be realized at high speed by shutting down the optical power of the corresponding wavelength paths.

The grooming of the wavelength paths is realized by reconstructing wavelength path connection.

The protection of the wavelength paths is conducted in case that the optical cross-connect systems 404a–404d themselves detect the occurrence of a wavelength path trouble or the deterioration of wavelength path quality, or in case the optical cross-connect systems 404a–404d themselves detect the AIS issued by the network elements of other optical layers.

The terminal stations 405a–405e include means for converting image, voice or data communication services which are electric signals to optical signals having appropriate wavelengths, and transmitting the optical signals through the optical fibers as mediums, and means for receiving the optical signals having the appropriate wavelengths through the optical fibers as mediums, converting the optical signals to electric signals, and utilizing image, voice or data communication services.

Image, voice or data communication services are converted to optical signals having appropriate wavelengths (referred to as a wavelength 1), and are transmitted from the terminal station 405a to the optical ADM 403a through the optical fibers as mediums. The plural wavelength optical signals guided to the optical ADM 403a are subjected to wavelength multiplexing and are input into the optical fibers 401a and 401b by the optical ADM 403a, which pass through the optical ADM 403a. At this time, the optical ADM 403a monitors a trouble or quality deterioration of optical signals to be input without depending on a transmission speed and format by means of a method utilizing optical power, and issuing an AIS utilizing optical power when detecting the trouble.

The optical ADM 403a are connected to the terminal station 405a, the optical ADM 403b and the optical ADM 403c, which constitutes the network 406a of a ring form. Similarly, the terminal station 405d is connected to the optical ADM 403d and the optical ADMs 403d and 403e are connected to each other through the optical fibers 401c and 401d, which constitutes the network 406b of a ring form.

The optical cross-connect systems 404a–404d are connected to each other in a mesh form through the optical fibers 401e–401n, which constitutes the network 406c. In this network 406c, the optical regenerative relay amplifiers 402a–402d are provided for collectively amplifying power of the plural wavelength optical signals subjected to multiplexing and inputted into the optical fibers 401e, 401f, 401j and 401i, respectively.

The optical cross-connect systems 404a–404d can change an optical fiber connection relation in the network 406c. Also, the optical cross-connect systems 404a–404d can monitor a trouble or quality deterioration of optical signals that are input without depending on a transmission speed and format by means of a method utilizing optical power, and issue an AIS utilizing optical power when detecting the trouble. Moreover, the optical cross-connect systems can also recover the trouble by switching a using system to a spare system by means of protection. Also, since the network 406a and the network 406b are connected to each other through the optical cross-connect systems 404a and 404c of the network 406c, the optical signals transmitted from the terminal station 405a can be received at the terminal station 405d provided in the network 406b through the network 406c from the network 406a. In other words, the optical cross-connect system 404c switches the optical paths so that the optical signals having the wavelength 1 are input to the network 406b, and thereby, the optical ADM 403d becomes able to receive the optical signals having the wavelength 1.

At this time, the optical cross-connect system 404c can monitor a trouble or quality deterioration of the optical signals without depending on a transmission speed and format by means of a method utilizing optical power, and can issue an AIS utilizing optical power when detecting the trouble. Moreover, by switching a using system to a spare system by protection, the trouble can be recovered. The optical ADM 403d selectively takes out only an optical signal having the wavelength 1 from the plural wavelength optical signals subjected to multiplexing and transmitted in the optical fibers 401c and 401d, and guides the optical signal to the terminal station 405d. At this time, the optical ADM 403d has a function for monitoring a trouble or quality deterioration of optical signals to be input without depending on a transmission speed and format by means of a method utilizing optical power, and issuing an AIS utilizing optical power when detecting the trouble.

The terminal station 405d converts the optical signals having the wavelength 1, which are input from the optical ADM 403d, to electric signals, and takes out video image, voice or data communication service. In other words, communication between points using the optical signals of the wavelength 1 is conducted, in which the terminal station 405a is a transmission terminal and the terminal station 405d is a reception terminal.

In the network 406c, in case that the optical signals having the wavelength 1 pass through the optical cross-connect systems 404a, 404b and 404c in that order, a path constructed of this terminal station 405a, the optical ADM 403a, the optical ADM 403b, the optical cross-connect system 404a, the optical regenerative relay amplifier 402a, the optical cross-connect system 404b, the optical cross-connect system 404c, the optical ADM 403d and the terminal station 405d, through which the optical signals pass, becomes a wavelength path 1 of a using system.

A change from the reception terminal station 405d to the reception terminal station 405e can be conducted by dividing with respect to a wavelength the optical signals which pass through the optical fiber 401d into optical signals having the wavelength 1 by means of the optical ADM 403d and passing the signals there through without guiding them to the terminal station 405d, and dividing the signals with respect to a wavelength in the optical ADM 403e and guiding them to the terminal station 405e. Also, a change from the transmission terminal station 405a to the transmission terminal station 405b can be similarly conducted by guiding the optical signals having the wavelength 1 from the terminal station 405a to the optical ADM 403a and not combining with respect to a wavelength the signals with the optical signals which pass through the optical fiber 401b, and guiding the optical signals having the wavelength 1 from the terminal station 405b to the optical ADM 403b and combining with respect to a wavelength the signals with the optical signals which pass through the optical fiber 401b Also, in the network 406c, by changing the connection of the optical signals by means of the optical cross-connect systems 404a–404d, it is possible to edit the wavelength path 1. In other words, it is possible to change the wavelength path 1 so as to change the connection of the optical signals having the wavelength 1, which pass through the optical cross-connect systems 404a, 404b and 404c in that order, to the connection of the optical cross-connect systems 404a and 404c in that order.

In the network 306c, a path for the wavelength path 1 of the using-system, which is connected to the optical cross-connect system 404a and the optical cross-connect system 404c, is set in the wavelength path 1 of the spare system, and the optical signals same as in the wavelength path 1 of the using system is transmitted to the path. In case that the optical fiber 401g is cut for some reason and a trouble occurs in the wavelength path 1 of the using system, the optical cross-connect system 404c detects the trouble and switches the optical signals to be guided to the network 406b from the wavelength path 1 of the using system to the wavelength path 1 of the spare system, and thereby, high speed protection can be realized.

In the networks 406a and 406b also, since the plural wavelength optical signals subjected to multiplexing are bidirectionally transmitted in the optical fibers 401a and 401b and the optical fibers 401c and 401d, respectively, it is possible to remove the cause of the failure. In other words, in the network 406*a*, in case that, in the optical fibers 401*a* and 401*b* connecting the optical ADM 403*b* to the optical cross-connect system 404*a*, a trouble occurs and communication between points of the terminal station 405*a* and the terminal station 405*d* by means of the wavelength path 1 is cut, it is possible to recover the trouble by selecting the same signals in an opposite direction between the optical cross-connect system 404*a* and the optical ADM 403*b* by means of the optical cross-connect system 404*a*, which are input through the optical ADM 403*a* and the optical ADM 403*c*. At this time, the wavelength path 1 is protected in the terminal station 405*a*, the optical ADM 403*a*, the optical ADM 403*b*, the optical ADM 403*a*, the optical ADM 403*c*, the optical cross-connect system 404*a*, the optical cross-connect system 404*b*, the optical cross-connect system 404*c*, the optical ADM 403*d* and the terminal station 405*d*. During the protection, monitoring of a trouble or quality deterioration of the optical signals utilizing optical power and a transfer of an AIS is conducted.

Since the wavelength path 1 is multiplexed in wavelength by optical signals having other wavelengths when passing through the optical fibers 401*a*–401*n*, the wavelength path 1 is bundled with the other wavelength paths by means of a wavelength multiplexing technique when passing through the optical fibers 401*a*–401*n*. Therefore, since even though a transmission speed or format contained in the wavelength path changes, this change does not affect the other wavelength paths, so it is not necessary to change a bundle method. The terminal stations that become transmission and reception terminals may only include an interface with the optical signals, and the communication between points can be conducted without normalizing the transmission speed or format.

Although the present invention was explained above according to the two embodiments, the kind of transmission information, arrangements of the using system, the spare system and the network elements, and an arrangement of the wavelength path and so forth can be suitably changed, and an arbitrary optical wave network system can be constructed.

In other words, although, in the above-described embodiments, the transmission of the video image, voice or data signals was explained, there is no restriction in the service information which is handled by the terminal stations, and any signals such as an internet and an MPEG can be adapted, and also, the transmission speed can be arbitrarily selected in accordance with the transmission signals.

Also, with regard to the spare system for the protection, one exclusive spare system can be allocated to one using system, and in addition to this, the network can be constructed so as to share one system or n (n<N) spare systems for N using systems. In this case, by means of a centralized control method or distributed control method, a manager which controls the entire network indicates the allocation of the spare system for the using system to each of the network elements. Moreover, it is not necessary that the wavelengths of the optical signals of the using system are the same as those of the spare system, and it is possible to construct a network in which the wavelengths of the optical signals of the using system can be different from those of the spare system.

Also, with regard to the optical cross-connect systems and the optical ADMs which are the network elements constituting the network system of the present invention, a method of placement thereof is arbitrary, and it is possible to structure the network by only the optical ADMs or only the optical cross-connect systems, for example. Also, with regard to the optical regenerative relay amplifiers, they can be placed between the optical ADM and the optical ADM of the network elements, between the optical cross-connect system and the optical cross-connect system or between the optical ADM and the optical cross-connect system, and the number of the optical regenerative relay amplifiers to be placed and an interval of the placement are arbitrary. Moreover, there is no restriction in the number of the terminal stations and the optical ADMs that are connected to the optical cross-connect system.

Also, carrier wavelengths of the wavelength paths formed between transmission and reception terminal ends can have the same wavelength at the transmission and reception terminal ends, and a virtual wavelength path can be used in which optical signals transmitted with the wavelength 1 are converted into the wavelength 2 in the network, and the wavelength 2 is converted again to the wavelength 1 and the wavelength 1 is received. At this time, there is no restriction in times of the wavelength conversion in the network. Of course, there is no restriction in a distance between the transmission terminal stations and the reception terminal stations where the wavelengths are terminated.

Moreover, the number of the wavelengths of optical signals to be handled and the wavelengths of the optical signals are arbitrary, and it goes without saying that a 1.5 $\mu$m band or 1.3 $\mu$m band can be used as the wavelengths of the optical signals, for example.

In accordance with the present invention, since monitoring of a trouble or quality deterioration of path connection and a transfer of a trouble alarm are conducted by means of a method which does not depend on a transmission speed and format of transmission signals contained in the wavelength paths, and since, in case a trouble or quality deterioration occurs in the wavelength paths, the network trouble can be recovered by protection from the wavelength paths of the using system to the wavelength paths of the spare system, and thereby, since it is possible to arbitrarily change a transmission speed of transmission signals and a signal method independently without taking a transfer of a trouble alarm and so forth into account, a transmission speed or signal format which is essential for the optical network system is not restricted by the monitoring of a trouble or quality deterioration of path connection, the transfer of a trouble alarm, and the trouble recovery method.

Accordingly, it is possible to conduct transmission of service information such as multimedia having various transmission speeds and formats. Particularly, by means of characteristic that the present invention does not depend on a transmission speed or format of a wavelength multiplexing communication technique, it can be realized by containing services having various transmission speeds and formats in a VP by an ADM layer, and housing this in the wavelength paths of an optical layer.

Also, since even though the contents of a service demand between points continuously change, it is not necessary to follow the change of the contents of the service demand and reconstruct the network, it is possible to simplify network control in communication between points.

Moreover, since an arrangement is adopted in which a change of optical power and optical amplitude is utilized as a method of monitoring a trouble or quality deterioration of path connection and transferring a trouble alarm, and thereby, since monitoring and recovery of a trouble of a network which conducts optical fiber communication can be conducted only by monitoring the power or an amplitude of optical signals, it is possible to simplify a trouble detecting process of a monitoring device, and it is possible to realize physical network trouble detection and recovery of the trouble at high speed. Particularly, since it is possible to physically switch wavelength paths of a using system to wavelength paths of a spare system at high speed, it becomes possible to recover a network trouble at high speed.

And, since it is not necessary to fixedly define a transmission speed and format for transmission signals, it is possible to easily deal with entrance of a new service of a new format in the future and increase capacity occupied by individual services, so the present invention has superior expandability.

Also, since monitoring of the wavelength oaths is conducted in the optical cross-connect systems, the optical ADMs and the optical regenerative relay amplifiers which are individual network elements that handle optical signals, and since recovery of the wavelength paths during a trouble is conducted, distributed control can be applied to a trouble detection and trouble recovery.

Moreover, the present invention is applicable to large capacity optical communication, since it is possible to conduct optical fiber communication with high throughput by utilizing a wavelength multiplexing technique in an optical layer.

The entire disclosure of Japanese Patent Application No. 9-268253 filed on Sep. 16, 1997 including the specification, claims, drawings and summary are incorporated herein by reference in its entirety.

What is claimed is:

1. An optical wave network system utilizing a wavelength or spatial multiplexing technique in which optical fibers are physical media, comiprising:

a plurality of optical signal terminal stations; and optical network elements connected to said optical fibers for forming wavelength paths between said optical signal terminal stations, said system monitoring a trouble or quality deterioration of physical path connection and transferring a trouble alarm through said optical network elements for every wavelength path without depending on a transmission speed or format contained in said wavelength paths, and in case that a trouble or quality deterioration of optical signals occurs in said wavelength paths, physically recovering a network trouble by performing a quick failure recovery from said wavelength paths of a using system to predetermined exclusive wavelength paths of a spare system by means of said optical network elements.

2. An optical wave network system according to claim 1, wherein said optical fibers constitute a plurality of transmission lines between said optical network elements, of which transmission directions of signals are different, and form wavelength paths having one or more than one different carrier wavelength transmission directions, in the direction of said signals, by wavelength multiplexing.

3. An optical wave network system according to claim 1, wherein said wavelength paths include virtual wavelength paths which are formed by conducting at least one wavelength conversion between wavelength path terminal ends by means of said optical network elements.

4. An optical wave network system according to claim 1, wherein said optical network elements include a plurality of optical ADMs and a plurality of optical cross-connect systems which are connected to said optical fibers.

5. An optical wave network system according to claim 4, having optical regenerative relay amplifiers between at least two adjacent said optical ADMs, between two adjacent said optical cross-connect systems or between said optical ADM and said optical cross-connect system adjacent to each other.

6. An optical wave network system according to claim 4, wherein said optical ADMs or said optical cross-connect systems have a function for physically reconstructing a network by reconstructing wavelength path connecting condition.

7. An optical wave network system according to claim 1, wherein monitoring of a trouble or quality deterioration of physical path connection and transfer of a trouble alarm through said optical network elements for every wavelength path is conducted by means of a change of average optical power of said optical signals or a change of an amplitude of said optical signals.

8. An optical wave network system utilizing a wavelength or spatial multiplexing technique in which optical fibers are physical media, comprising:

a plurality of optical signal terminal stations; and optical network elements connected to said optical fibers for forming wavelength paths between said optical signal terminal stations, said system monitoring a trouble or quality deterioration of physical path connection and transferring a trouble alarm through said optical network elements for every wavelength path without depending on a transmission speed or format contained in said wavelength paths, and in case that a trouble or quality deterioration of optical signals occurs in said wavelength paths, recovering a network trouble by performing a quick failure recovery by retrieving wavelength paths of a spare system that is not in use and is shared in a network from said wavelength paths of a using system by means of said optical network elements.

9. An optical wave network system according to claim 8, wherein said optical fibers constitute a plurality of transmission lines between said optical network elements, of which transmission directions of signals are different, and form wavelength paths having one or more than one different carrier wavelength transmission directions, in the direction of said signals, by wavelength multiplxing.

10. An optical wave network system according to claim 8, wherein said wavelength paths include virtual wavelength paths which are formed by conducting at least one wavelength conversion between wavelength path terminal ends by means of said optical network elements.

11. An optical wave network system according to claim 8, wherein said optical network elements include a plurality of optical ADMs and a plurality of optical cross-connect systems which are connected to said optical fibers.

12. An optical wave network system according to claim 11, having optical regenerative relay amplifiers between at least two adjacent said optical ADMs, between two adjacent said optical cross-connect systems or between said optical ADM and said optical cross-connect system adjacent to each other.

13. An optical wave network system according to claim 11, wherein said optical ADMs or said optical cross-connect systems have a function for physically reconstructing a network by reconstructing wavelength path connecting condition.

14. An optical wave network system according to claim 8, wherein monitoring of a trouble or quality deterioration of physical path connection and transfer of a trouble alarm through said optical network elements for every wavelength path is conducted by means of a change of average optical power of said optical signals or a change of an amplitude of said optical signals.

15. A method of monitoring a network trouble in an optical wave network system utilizing a wavelength or spatial multiplexing technique in which optical fibers are physical media, and comprising a plurality of optical signal terminal stations, and optical network elements connected to said optical fibers for forming wavelength paths between said optical signal terminal stations, said method comprising steps of:

monitoring a trouble or quality deterioration of physical path connection and transferring a trouble alarm through said optical network elements for every wavelength path without depending on a transmission speed or format contained in said wavelength paths; and in case that a trouble or quality deterioration of optical signals occurs in said wavelength paths, physically recovering a network trouble by performing a quick failure recovery from said wavelength paths of a using system to predetermined exclusive wavelength paths of a spare system by means of said optical network elements.

16. A method of monitoring a network trouble in an optical wave network system according to claim 15, wherein said optical fibers constitute a plurality of transmission lines between said optical network elements, of which transmission directions of signals are different, and form wavelength paths having one or more than one different carrier wavelength transmission directions, in the direction of said signals, by wavelength multiplexing.

17. A method of monitoring a network trouble in an optical wave network system according to claim 15, wherein said wavelength paths include virtual wavelength paths which are formed by conducting at least one wavelength conversion between wavelength path terminal ends by means of said optical network elements.

18. A method of monitoring a network trouble in an optical wave network system according to claim 15, wherein said optical network elements include a plurality of optical ADMs and a plurality of optical cross-connect systems which are connected to said optical fibers.

19. A method of monitoring a network trouble in an optical wave network system according to claim 15, having optical regenerative relay amplifiers between at least two adjacent said optical ADMs, between two adjacent said optical cross-connect systems or between said optical ADM and said optical cross-connect system adjacent to each other.

20. A method of monitoring a network trouble in an optical wave network system according to claim 18, wherein said optical ADMs or said optical cross-connect systems have a function for physically reconstructing a network by reconstructing wavelength path connecting condition.

21. A method of monitoring a network trouble in an optical wave network system according to claim 15, wherein monitoring of a trouble or quality deterioration of physical path connection and transfer of a trouble alarm through said optical network elements for every wavelength path is conducted by means of a change of average optical power of said optical signals or a change of an amplitude of said optical signals.

22. A method of monitoring a network trouble in an optical wave network system utilizing a wavelength or spatial multiplexing technique in which optical fibers are physical media, comprising a plurality of optical signal terminal stations, and optical network elements connected to said optical fibers for forming wavelength paths between said optical signal terminal stations, said method comprising steps of:

monitoring a trouble or quality deterioration of physical path connection and transferring a trouble alarm through said optical network elements for every wavelength path without depending on a transmission speed or format contained in said wavelength paths; and in case that a trouble or quality deterioration of optical signals occurs in said wavelength paths, recovering a network trouble by performing a quick failure recovery by retrieving wavelength paths of a spare system that is not in use and is shared in a network from said wavelength paths of a using system by means of said optical network elements.

23. A method of monitoring a network trouble in an optical wave network system according to claim 22, wherein said optical fibers constitute a plurality of transmission lines between said optical network elements, of which transmission directions of signals are different, and form wavelength paths having one or more than one different carrier wavelength transmission directions, in the direction of said signals, by wavelength multiplexing.

24. A method of monitoring a network trouble in an optical wave network system according to claim 22, wherein said wavelength paths include virtual wavelength paths which are formed by conducting at least one wavelength conversion between wavelength path terminal ends by means of said optical network elements.

25. A method of monitoring a network trouble in an optical wave network system according to claim 22, wherein said optical network elements include a plurality of optical ADMs and a plurality of optical cross-connect systems which are connected to said optical fibers.

26. A method of monitoring a network trouble in an optical wave network system according to claim 25, having optical regenerative relay amplifiers between at least two adjacent said optical ADMS, between two adjacent said optical cross-connect systems or between said optical ADM and said optical cross-connect system adjacent to each other.

27. A method of monitoring a network trouble in an optical wave network system according to claim 25, wherein said optical ADMs or said optical cross-connect systems have a function for physically reconstructing a network by reconstructing wavelength path connecting condition.

28. A method of monitoring a network trouble in an optical wave network system according to claim 25, wherein monitoring of a trouble or quality deterioration of physical path connection and transfer of a trouble alarm through said optical network elements for every wavelength path is conducted by means of a change of average optical power of said optical signals or a change of an amplitude of said optical signals.

* * * * *